United States Patent [19]

Kopelman et al.

[11] Patent Number: 5,361,314
[45] Date of Patent: Nov. 1, 1994

[54] MICRO OPTICAL FIBER LIGHT SOURCE AND SENSOR AND METHOD OF FABRICATION THEREOF

[75] Inventors: Raoul Kopelman; Weihong Tan; Zhong-You Shi, all of Ann Arbor, Mich.

[73] Assignee: The Regents Of The University of Michigan, Ann Arbor, Mich.

[21] Appl. No.: 941,879

[22] Filed: Sep. 4, 1992

[51] Int. Cl.$^5$ ............................ G02B 6/00; H01J 5/16; B05D 5/06

[52] U.S. Cl. ...................................... 385/12; 385/33; 385/43; 385/31; 385/38; 385/123; 427/162; 427/163.2; 359/368; 359/385; 250/227.11; 250/227.14

[58] Field of Search ..................... 385/12, 125, 33, 43, 385/14, 31, 123, 38; 359/368, 385; 250/227.14, 227.18, 227.11; 427/162, 163, 457, 487

[56] References Cited

U.S. PATENT DOCUMENTS

| | | | |
|---|---|---|---|
| 3,932,184 | 1/1976 | Cohen et al. | 385/33 X |
| 4,067,937 | 1/1978 | Unno et al. | 385/33 X |
| 4,137,060 | 1/1979 | Timmermann | 385/33 X |
| 4,380,365 | 4/1983 | Gross | 385/33 X |
| 4,671,609 | 6/1987 | Khoe et al. | 385/33 X |
| 4,795,228 | 1/1989 | Schneider | 385/33 X |
| 4,842,783 | 6/1989 | Blaylock | 385/12 |
| 4,929,049 | 5/1990 | Le Goullon et al. | 385/12 |
| 5,011,254 | 4/1991 | Edwards et al. | 385/33 X |
| 5,037,174 | 8/1991 | Thompson | 385/33 |
| 5,062,686 | 11/1991 | Barrow et al. | 385/33 |
| 5,096,671 | 3/1992 | Kane et al. | 385/12 |
| 5,105,305 | 4/1992 | Betzig et al. | 385/12 |
| 5,127,080 | 6/1992 | Duggan, Sr. | 385/120 |

OTHER PUBLICATIONS

Lieberman, A Light Source Smaller Than the Optical Wavelength, Science vol. 247, Jan. 5, 1989, pp. 59–61.

*Primary Examiner*—Brian Healy
*Attorney, Agent, or Firm*—Harness, Dickey & Pierce

[57] ABSTRACT

This invention relates generally to the development of and a method of fabricating a micro optical fiber light source. An optical fiber micro-light source is presented whose aperture is extremely small yet able to act as an intense light source. Light sources of this type have wide ranging applications, including use as micro-sensors in NSOM. Micro-sensor light sources have excellent detection limits as well as photo stability, reversibility, and millisecond response times. Furthermore, a method for manufacturing a micro optical fiber light source is provided. It involves the photo-chemical attachment of an optically active material onto the end surface of an optical fiber cable which has been pulled to form an end with an extremely narrow aperture. More specifically, photopolymerization has been applied as a means to photo-chemically attach an optically active material. This process allows significant control of the size of the micro light source. Furthermore, photo-chemically attaching an optically active material enables the implementation of the micro-light source in a variety of sensor applications.

12 Claims, 2 Drawing Sheets

MICRO OPTICAL FIBER LIGHT SOURCE AND SENSOR AND METHOD OF FABRICATION THEREOF

This invention was made with government support under Grant Nos.: DE-FG02-90-ER60984 and DE-FG02-90-ER61085 awarded by the Department of Energy. The government has certain rights in the invention.

BACKGROUND AND SUMMARY OF THE INVENTION

This invention relates generally to the field of near-field scanning optical microscopy (NSOM), and more particularly to the development of and a method of fabricating a micro optical fiber light source which may be used as a light source or alternatively in a variety sensor applications.

Microscopes that employ conventional optical imaging techniques are generally limited in their ability to resolve features that are substantially smaller than approximately ½ the wave length of light. Consequently, NSOM techniques have been employed to achieve resolution better than ½ the wave length of light. In general, NSOM requires that the aperture diameter be less than the wavelength of light and also that the aperture be positioned in extremely close proximity to the specimen to be examined. NSOM generally relates to the interaction of light impinged upon a sample with the sample to be examined. The strength of the light is generally a function of the probe position relative to the sample.

There are several known methods to designing probes to be used in NSOM. One such method is the use of tapered glass pipettes where an optical aperture is defined at the narrow end of the pipette by metalizing the annular region at the very end of the pipette. A second method is using a single mode optical fiber having a flat end and a highly tapered terminal portion whose outer walls are coated with metal, leaving a bare portion to function as an aperture at the very end of the fiber. The above two design approaches for NSOM probes involve certain inherent limitations. One such limitation is the decrease in signal strength because of the aperture size. A second limitation is that the thickness of the metal layers generally applied to the tapered portion of the probes contribute to the size of the probe tip, thereby enlarging the probe tip.

Several of these disadvantages were addressed in later developments which included the incorporation of fluorescent means into the probe tip. The fluorescent means enabled designers to develop an even smaller aperture than those existing in the above mentioned probes. With respect to optical fibers, there is a limitation on the implantation of the fluorescent means onto the probe tip of an optical fiber. While it is possible to implant fluorescent means onto a tapered optical fiber tip, the implantation methods are limited to one of two means. The first such means is ion implantation of an appropriate metal such as cerium, terbium, and europium. Alternatively, fluorescent means may be implanted onto the optical fiber through use of a borehole in the tip of the optical fiber after which fluorescent means, such as dyes, may be implanted into the bore hole. Neither of these two methods, however, result in a chemical attachment of the fluorescent means to the optical fiber tip.

This invention is directed to an improved micro light source (note than micro as used herein refers to light sources on this order of less than 100 microns) and method of fabrication thereof wherein a process is employed to photo-chemically attach an optically active material to the tip of a significantly tapered optical fiber. This results in an optical fiber light source whose aperture is extremely small yet able to act as an intense light source. Light sources of this type have wide ranging applications across a variety of chemical, biological, and medical fields including use as micro-sensors in NSOM. As a micro-sensor, the light source has excellent detection limits as well as photo stability, reversibility, and millisecond response times. Furthermore, successful applications of light sources as sensors include intracell and intra-embryo measurements. Such micro-sensors also have potential applications which include spatially and temporally resolved chemical analysis and kinetics inside single biological cells and their substructures.

A further aspect of this invention involves a method for manufacturing an optical fiber micro optical fiber light source. This method involves the photo-chemical attachment of an optically active material onto the end surface of an optical fiber cable which has been pulled to form an end with a dimension on the order less than 100 microns. More specifically, photopolymerization has been applied as a means to photo-chemically attach the optically active material. This process allows significant control of the size of the micro light source as the degree of photopolymerization varies in accordance with the reaction time of the polymerization process and the shape of the material photopolymerized onto the optical fiber tip varies in accordance with the intensity of the light coupled to the optical fiber and emitted in the direction of the tip. Furthermore, photo-chemically attaching an optically active material enables the implementation of the micro-light source in a variety of sensor applications. In yet a further aspect of this invention, the photo-chemical attachment process may be performed in multiple stages.

Further objects, features and advantages of the invention will become apparent from a consideration of the following description and the appended claims when taken in connection with the accompanying drawings.

DETAILED DESCRIPTION OF THE INVENTION

Figure 1:
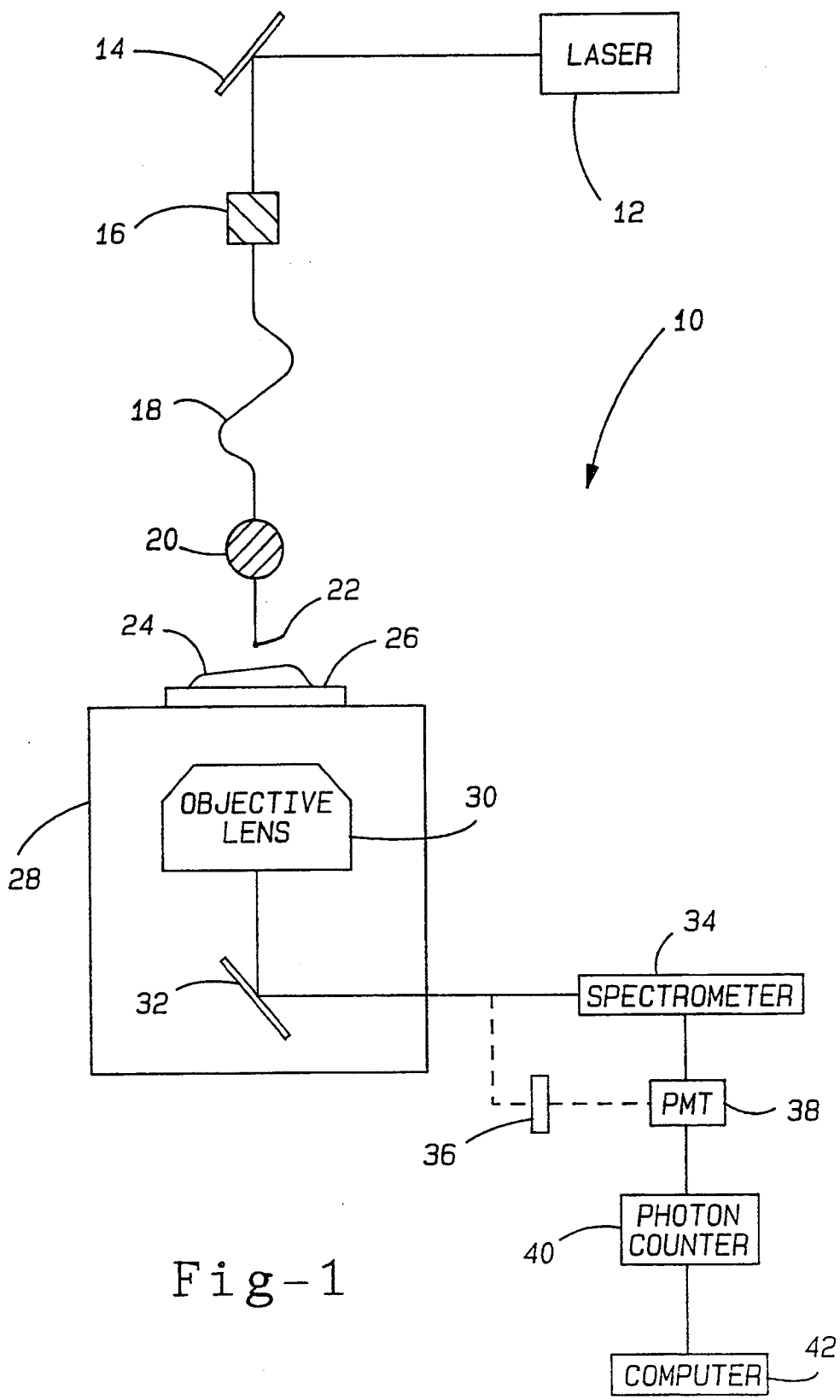
FIG. 1 is a block diagram of the system used to implement the micro light source as an optical fiber micro-sensor.

FIG. 1 depicts a block diagram of the system 10 which implements the optical fiber micro-light source. Here the micro-light source is employed in an NSOM application and functions as a sensor. A laser 12 generates an ion laser beam which is reflected off mirror 14 and directed into coupler 16. Coupler 16 focuses the laser beam produced by laser 12 so that it may be directed into optical fiber 18, as the laser beam generally produced by laser 12 is of a diameter larger than optical fiber 18 and consequently can not be focused directly into it. Optical fiber 18 further directs the laser beam towards the optical micro-sensor 22, which herein is implemented using a micro-light source to be described further herein with respect to FIGS. 2, 3, and 4. Microsensor 22 is positioned with respect to sample 24 using a three way translational stage 20 capable of positioning micro-sensor 22 in any one of three orthorganal directions. Sample 24 rests on glass slide 26 which is further attached to inverted microscope 28. In this particular application, the inverted microscope 28 is an inverted frame fluorescence microscope comprising an objective lens 30 to collect light and focus that light onto mirror 32 represented herein by a dichoric mirror. The light is further directed to a spectrometer 34 where the light emissions collected by objective lens 30 are separated into individual component wavelengths.

Alternatively, light collected by objective lens 30 and reflected by dichoric mirror 32 may be passed through a band pass filter 36 and then into photo multiplier tube 38. Photo multiplier tube 38 translates light frequencies into electrical pulses to be further measured by photon counter 40 and recorded by computer 42. Photon counter 40 measures the intensity of the light collected by objective lens 30 by evaluating the electrical signal output by photo multiplier tube 38. The entire system 10 may optionally be mounted on an air table in order to ensure vibration isolation.

Figure 2:
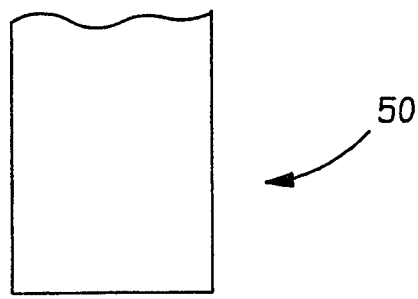
FIG. 2 is a drawing of a typical optical fiber.
Figure 3:
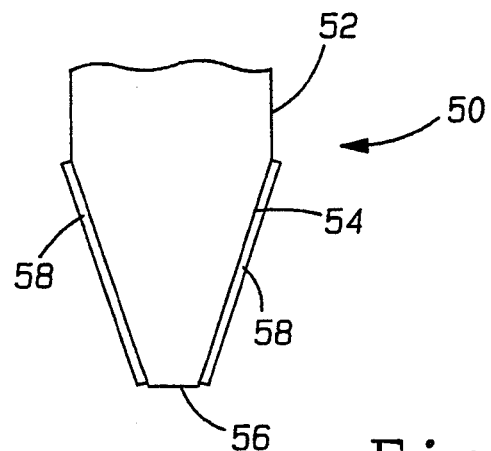
FIG. 3 is a drawing of a optical fiber which has been pulled to taper down to a micro optical fiber tip.
Figure 4:
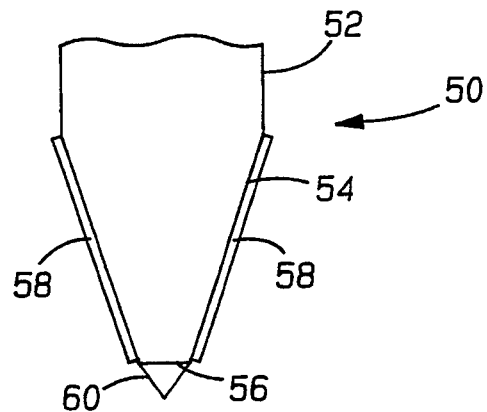
FIG. 4 is a drawing of a pulled tip optical fiber light source which has been polymerized at the end surface with an optically active material.

The primary focus of this invention is the fabrication and use of optical fiber micro-light sources. With respect to FIG. 1 the use of a micro-light source as optical fiber micro-sensor 22 enables the implementation of near-field scanning optical microscopy (NSOM). The fabrication and use of the micro-light sources to be described herein have applications in a variety of scientific fields including use as micro-sensors with improved limits, improved response time, and improved spatial resolution. Referring specifically to FIGS. 2, 3, and 4, the fabrication of the optical fiber micro-light sensor will be described herein.

FIG. 2 shows a typical optical fiber 50 used as a starting point for fabricating the optical fiber micro-light source. The optical fiber is removed from its jacket and heated using an infrared laser. Simultaneously, the optical fiber is mounted in a micropipette puller and is subsequently stretched while being heated. This forms an optical fiber as embodied in FIG. 3. The pulled optical fiber includes a body 52 of substantially the same diameter as an unpulled optical fiber, a tapered portion 54 and a substantially flat end face defined as an optical fiber tip 56. The tapered portion 54 of optical fiber 50 is then coated with an opaque material 58 which inhibits the escape of light from the tapered portion 54 of optical fiber 50. Note that only the sides of the tapered portion 54 are coated with opaque material 58 and the optical fiber tip 56 of optical fiber 50 is not covered by opaque material 58. The end face or tip 56 of optical fiber 50 is then chemically activated, herein effectuated using standard silanization methods. Chemically activating tip 56 serves to improve the attachment between tip 56 and the optically active material 60 to be subsequently chemically attached to the optical fiber tip 56.

Using standard methods, a polymer solution is prepared in anticipation of chemically attaching onto the optical fiber tip 56. The composition of this polymer solution varies in accordance with the desired application of the micro-light source. The optically active material includes any material which is in any manner responsive to excitation with light. For example, the material may fluoresce in a particular manner under a specified set of conditions and fluoresce differently under different conditions. After the solution is prepared, it is chemically attached to optical fiber tip 56 using known methods of photopolymerization. More specifically, the optical fiber tip 56 is placed near the polymer solution and laser light is coupled into the non-tapered end (not shown) of optical fiber 50 and transmitted to the optical fiber tip 56 to photo-initiate polymerization onto the silanized surface.

It should be noted that while photopolymerization is specified in this particular embodiment, there are several variations which are possible. The fabrication process photo-chemically attaches the optically active material to the optical fiber tip. Any method of photo-chemically attaching the optically active material to fiber optic tip 56 would suffice. Furthermore, the optically active material is dependent upon the desired application of the micro-light source. Some sensor applications may call for a reactive material that may include a fluorescent dye. Other application such as using the micro-light source strictly as a non-reactive light source may, for example, require a more durable, non-reactive material.

The result of this photopolymerization process is depicted in FIG. 4. In FIG. 4, optical fiber 50 includes a non-tapered portion 52, tapered portion 54 coated with an opaque material 58, an end face or tip 56 to which is photopolymerized a cone of polymer material defined as the optical fiber probe 60. It should be noted that the photopolymerization reaction rate depends on the concentrations of the reactants, the reaction temperature, and the light intensity emitted from the fiber tip 56. More specifically, the thickness of the probe 60 prepared by photopolymerization can be controlled to any size in accordance with the reaction time. Thus, the thickness of the probe 60 is controlled by the reaction time used to photopolymerize the optically active material onto the fiber optic tip 56. Using these methods on a non-tapered (i.e., one not pulled to micro size) optical fiber enables the designer to determine the relationship between the thickness of the probe 60 and the polymerization reaction time under specific reaction conditions. This relationship further serves as a guideline for optimization of reaction time and intensity of the light employed in the polymerization process in order to determine the size of the probe 60.

SPECIFIC EXAMPLE I

Chemicals. All of the chemical reagents used were purchased from Aldrich Chemical Co., except for the fiber surface silanization reagents [γ-(methacryloxy) propyl] trimethoxysilane] and (aminopropyl) triethoxysilane, obtained from Sigma. All chemicals were used without further purification.

Fiber Tip Fabrication. The apparatus used for fiber tip fabrication consists of a P-87 Micropipette Puller (Sutter Instrument Co.) and a 25 watts $CO_2$ infrared laser (Synrad Co.). Multi-mode all-silica fibers (General Fiber Inc.) had core diameters ranging from 80μm to 200μm (General Fiber Inc.). Single mode fibers (Newport Research Corp. and 3M Co.) had core diameters of a few microns and cladding diameters around 100 μ. All fibers were terminated at a length of 1 to 2 meters. The jacket was removed from the fiber where the fiber tip was to be formed. The fiber tip was produced by drawing an optical fiber in the puller while heating it with the $CO_2$ infrared laser. By using appropriate program parameters and laser power, optical fibers were tapered to 0.1 to 1μm tips, hereafter referred to as pulled tips. A high vacuum chamber was employed for coating these pulled fiber tips. Only the optical fiber sides were coated with aluminum, leaving the end face as a transmissive aperture. To transform it into a light source, a laser beam was coupled to the opposite end of the pulled fiber tip.

Surface Activation by Silanization. Two different kinds of fiber surface silanization were used in the experiments. The first was with [γ-(methacryloxy)propyl]trimethoxysilane, and the second was with (aminopropyl) triethoxysilane. Both were successful. The former was preferred because it is simpler than the second.

Preparation of Acryloylfluorescein. Before used for photopolymerization, fluoresceinamine was converted into its amide derivative, acryloylfluorescein. The derivative was formed after reaction of 2:1 to 3:1 stoichiometric quantities of acryloyl chloride with fluoresceinamine in dry acetone, which was obtained by drying HPLC grade acetone in silica gel. The mixture was stirred for about one hour until most of the product precipitated. The product was collected by filtration, then washed by both acetone and by $CH_2Cl_2$ a few times. It was dried in air by evaporation, and stored in the dark.

Polymer Solution Preparation. The solution for polymerization on the fiber surface was a mixture which consisted of three solutions. The methods of preparation of these solutions have been described previously (See Hicks, et al. Anal. Chem., 1966, 38,726–30.; Munkholm, et al., Anal Chem., 1986, 58, 1426–30.; Rempp, Polymer Synthesis, 2nd, Rev. Ed., Heidelberg N.Y., Huthig & Wepf, 1991, p. 419–459). Modifications made for this work will be briefly discussed. Acryloylfluorescein, prepared as described above, was dissolved in ethanol, with concentrations around 15 mM. This replaced solution 3 in Munkholm et al. Solutions 1 and 2 were pH=6.5 buffer solutions of acrylamide and N,N-methylenebis (acrylamide), respectively. They were prepared according to the procedures of Hicks et al. The monomer solution, referred to as solution 4 hereafter, was formed by combining 10 ml of solution 1, 40 ml of solution 2, and 2 ml of solution 3. Solution 4 can be stored in a refrigerator for about one month without evident polymerization.

Thermal and Photopolymerizations. The reactor used for both polymerizations was a small glass bottle with three holes in its cover, through which the fiber tip was inserted into the monomer solution, nitrogen was introduced through a glass tube and a small glass rod was introduced to test the gelation of the monomer solution. An oil bath heater was used to control the reaction temperature between 50 and 80° C.

For most submicron sensor development, photo-initiated polymerization was used while thermal initiation has also been tried. One difference between them was that it was necessary to add a catalyst to solution 4 for thermal polymerization, while light was employed for initiation in the photopolymerization. The catalyst was riboflavin or persulfate of either potassium or ammonium. It should be noted that the thermal reaction could not occur without both heating (to about 70° C.) and catalyst.

The disadvantages of the thermal polymerization were first, there was limited control over where the polymer grew, hence, polymers were formed anywhere along the portion of the tip immersed in the solution; second, once the reaction was initiated, all the solution inside the whole reactor polymerized quickly, thus miniaturization was not readily realized; third, it was relatively difficult to optimize the reaction conditions for the thermal polymerization.

For photopolymerization, light initiation and heating were combined. The fiber tips were first silanized for about one hour and then dried in air for another hour. Before being placed in solution 4 for polymerization, fiber tips were first sensitized by soaking in a benzophenone/cyclohexane solution for about 15 minutes. They were then put into solution 4 for photopolymerization. Solution 4 was bubbled with nitrogen for about 20 minutes before laser light was directed into the fiber tip and the nitrogen atmosphere was maintained during the reaction. Laser light 442 nm for a He/Cd laser or 488 nm from an Ar ion laser was coupled into the fiber and transmitted to the tip where photopolymerization was initiated directly on the silanized surface.

Some heating was usually needed for the reaction, and ten to thirty minutes of polymerization was necessary in order to get acceptable sensors, which enabled sufficient control over the thickness of the polymers on the sensor tips. The polymerization reaction rate depended on the concentrations of reactants, the reaction temperature, and the light intensity emitted from the fiber tip. The thickness of the sensor prepared by photopolymerization was close to the size of its diameter. The thickness of the polymer on the fiber tip was controlled by the reaction time allowed for the polymerization on the fiber tip. Because the sizes of the submicron fiber tips were very small and could not be resolved well by a conventional microscope, systematic thickness monitoring was performed by using unpulled single-mode fibers, and the relationship between the thickness of the polymer and the polymerization reaction time under specific reaction conditions was calculated. This relationship serves as a good guidelines with which to optimize the reaction time on submicron fiber tips in such a way that the thickness of the polymer was close to its diameter. The longer the sensor stays in the monomer solution, the thicker the sensor will be.

It should be noted that in the submicron sensor preparation process, the depth of the fiber tip inserted into all of the solutions was strictly controlled either for pre-treatments or for polymerization. A three way XYZ stage with Z resolution of 0.07μm was used to position the fiber tip thus only the fiber tip end surface will come in contact with all of the solutions. For some cases, it was noticed that there was a liquid rise at the interface between the liquid surface and the fiber tip due to surface tension. Therefore, some monomer solution remained on the Al coated side surface. This, however, did not affect the operation of this sensor since internal illumination was used and no light was emitted from the sides of the probes.

A 0.3W 488 nm Argon ion laser beam was used for excitation of the polymer. The spectra were taken from 490 nm to 650 nm while the sensor was immersed inside a pH=7 buffer solution. The data for the pH response of the sensor tip were collected at 540 nm by using a combination of a dichroic mirror and a band-pass filter. Using the apparatus shown in FIG. 1, intensities of the fluorescence of the polymer at the submicron sensor tip under different pH environments were recorded by a photon counting system (EG&G photon counter Model 1109 and Discriminator Control Unit Model 1121) with a Hamamatsu R1529 photomultiplier tube controlled by an IBM PC computer.

Response Time of Submicron pH Sensor. Response times of the submicron sensors were determined by the microscope-based sensor apparatus shown in FIG. 1. Ten milliseconds was used as the data acquisition time in order to get time resolved data. The submicron pH sensor was immersed inside a 10 ml glass container with distilled water as the test sample. The sensor was positioned towards the microscope objective and light collection was optimized. While data acquisition occurred, a tiny drop of 0.1 m HCl or NaOH was added to the distilled water in the glass container. A curve of the signal changing from one level to another is recorded over time, giving an upper limit for the response time of the submicron pH sensor. Note that no stirring took place and thus, most likely, this "response time" was determined by both the diffusion to the sensor and that inside the sensor.

SPECIFIC EXAMPLE II

An apparatus utilizing the submicron fiber optic sensor (See Example I) was implemented to measure the pH of a substance. Light signal was collected through the objective lens of a microscope to increase the collection efficiency by one or more orders of magnitude compared to back collection (through the same fiber) which is commonly used in NSOM. An Olympus inverted frame fluorescence microscope was connected with either an optical multichannel analyzer (OMA) or a photomultiplier tube (PMT). A 488 nm AR+ or a 442 nm He/Cd laser beam was used for excitation of the dye polymer.

After pulling, the multi-mode and single-mode fiber's end structure tapered uniformly from the original fiber to a submicrometer tip with a flat end-surface perpendicular to the fiber axis. The sides were coated with aluminum, and the flat end of the tip was left bare forming tiny aperture. When a 30 mw 442 nm laser beam was coupled into the aluminum coated fiber tip, a very bright spot at the tip could be seen under the microscope. The probe delivered light very efficiently to the aperture as all the radiation remained bound to the core until a few micrometers from the tip. The signal emerging from a randomly chosen 0.2 $\mu$m fiber tip was $10^{12}$ photons per second as measured by using neutral density filters. Scanning electron microscopy showed that the sizes of the fiber tips were from 0.1 to 1$\mu$m, with most around 0.5$\mu$m.

The dependence of the fluorescence intensity on pH was opposite for these two excitations. For 442 nm excitation, higher pH decreased the fluorescence intensity whereas for 488 nm excitation, higher pH increased the fluorescence intensity. This is a consequence of the isosbestic point in the absorption spectra.

Micro pH fiber sensors were tested with nine different buffer solutions from pH=4 to pH=9. Measurements were cycled several times from pH=4 to 9. For each pH buffer solution, a fluorescence spectrum of the sensor was recorded by the OMA system. The typical exposure time for determining the fluorescence spectrum was 0.5 to 10s for submicrometer sensors. The use of the OMA system greatly enhanced the efficiency and precision of the experimental results. Moreover, since very short sensor excitation times were used, no evidence of photobleaching was observed after repeated experiments over a long time period. Thus, the lifetime of the sensor has been prolonged.

The ratio of the intensities at two different wavelengths was utilized to quantify pH. The ratios at 540/490 nm and 540/610 nm were large enough for a sensor to measure pH sensitivity in the physiological range. Only certain wavelength combinations give accurate calibration. Different sensors have slightly different behaviors for their intensity ratios due to the sensor geometry or dye distribution (aggregation).

The feasibility of the miniaturized optical fiber sensor and the internal calibration technique was tested with some aqueous solutions and several biological samples. The biological samples tested were blood cells, frog cells and various aged rat embryos during their early life (from 8 days to 12 days). For example, consider the pH measurement of a mid-gestation rat embryo. The optical fiber sensor is inserted into the extraembryonic cavity of the embryo. Thus, only a single embryo was required to measure pH, while previously over one thousand embryos had to be "homogenized" for a single measurement (15). The single embryo pH measurements (e.g. pH 7.50±0.05 for day 10 rat embryo) fully agree with those from "homogenized" samples (e.g. pH=7.46±0.06 for day 10 rat embryos). Furthermore, the measurements carried out by our sensors are nondestructive single-cell operations.

The accuracy of the optical fiber sensors was compared to that of a macroscopic standard high-precision pH meter(Omega), using four aqueous solutions in the physiological pH range. The results from the sensor are close to those obtained from the commercial pH meter and demonstrate the effectiveness of the internal calibration method in quantifying pH.

Aiming at enhancing the working ability of the miniaturized optical fiber sensors, several internal calibration methods were used to quantify pH that appeared simpler and apparently better than previously reported approaches. The method was based on the fluorescence intensity ratio obtained from different wavelengths of the same emission spectrum for a single dye. It was highly effective for small-sized sensors, especially when dye species absorption differences are also used. Because various ratios could be obtained by selecting the intensities at different wavelengths of the same spectrum, this approach provided more than a double check for a single experiment. The change in the ratio per pH unit was increased up to ten times if two different excitation sources were used. Thus it greatly enhanced the sensitivity and accuracy of our measurements and greatly improved the working ability of these miniaturized sensors in biological samples.

While the above description constitutes the preferred embodiments of the present invention, it will be appreciated that the invention is susceptible to modification, variation, and change without departing from the proper scope and fair meaning of the accompanying claims.

We claim:

1. An optical fiber light source comprising an optical fiber having one end of said fiber substantially uniformly tapered to define a tapered portion of said optical fiber, said tapered portion being less than 10 micrometers in diameter and having an end face to further define an optical fiber tip, aid tapered portion also having sides coated with an opaque material to prevent the escape of light from said tapered portion, and an optically active material photo-chemically attached to said optical fiber tip, said optically active material inwardly tapering away from said optical fiber tip and having a size and shape in accordance with a duration and an intensity of light applied during said photo-chemical attachment process, and said optically active material being responsive to excitation by light.

2. The apparatus of claim 1 wherein said opaque material preventing the escape of light from the tapered portion of said optical fiber is a compound substantially comprised of a metal.

3. The apparatus of claim 1 wherein the optical fiber tip of said optical fiber light source is chemically activated before chemical attachment of the optically active material to said optical fiber tip to improve adherence.

4. The apparatus of claim 1 wherein said optically active material is chemically attached to said fiber optic tip using a photopolymerization process in which light is coupled into a non-tapered end of said optical fiber to enable fabrication of the optically active material to a desired size and shape in accordance with the duration and intensity of light associated with the photopolymerization process.

5. The apparatus of claim 4 wherein said photopolymerization process may occur repeatedly in order to photopolymerize substantially different chemically active materials.

6. The apparatus of claim 4 wherein said photopolymerization process may occur repeatedly in order to photopolymerize said optically active material onto said fiber optic tip in progressive steps.

7. The apparatus of claim 1 wherein said optically active material includes an illuminescent dye which is optically responsive to a particular environment.

8. A method of fabricating an optical fiber light source comprising:
pulling one terminal end of an optical fiber to form a taper having a diameter less than 10 micrometers at said terminal end of the optical fiber and an end surface of the tapered portion of said optical fiber to define a tip;
coating the tapered portion of said optical fiber with an opaque material which substantially prevents escape of light from the tapered portion of said optical fiber and directing said light toward the tip of said tapered end;
chemically activating the tip of said optical fiber to improve chemical attachment between said tip and an optically active material to be attached thereto;
photo-chemically attaching said optically active material to the chemically activated tip of said optical fiber to form an inwardly tapering probe tip of said optical fiber sensor, said inwardly tapering probe tip having a size and shape controlled by varying a duration and an intensity of light applied during said photo-chemical attachment process, and said optically active material being responsive to excitation by light.

9. The method described in claim 8 wherein chemically attaching said optically active material to the chemically activated tip of said optical fiber comprises photopolymerization in which light is coupled to the non-tapered end of said optical fiber and the size and shape of said optically activated material varies in accordance with said duration and intensity of light associated with said photopolymerization process.

10. The method described in claim 8 wherein photopolymerization onto the chemically activated tip of said optical fiber comprises coupling light of a given wavelength into the non-tapered end of said optical fiber to photopolymerize said optically active material onto said chemically activated surface wherein said coupled light photopolymerizes the optically active material to form said optically active material in a substantially conical shape.

11. A fiber optic light source sensor wherein said sensor includes:
an optical fiber including a first tapered terminal end and a tip as defined by an end face of the tapered optical fiber, said tip having a diameter less than 10 micrometers;
an optically active material photopolymerized for a duration with light having an intensity onto the tip of said tapered end in an inward taper and having a size and shape controlled by said duration and intensity of light of the photopolymerization process, said optically active material including a dye whose optical response varies in accordance with the particular condition to be sensed:
a light source coupled to a second non-tapered end of said optical fiber where said light source generates light of predetermined intensity and wavelength;
a means for disposing said optically active material of said optical fiber in close proximity to a sample;
an objective lens disposed in proximity to the optically active material of said optical fiber so that light emitted from said material is collected by said objective lens after interaction with the sample; and
a means for analyzing said light emissions absorbed by said objective lens.

12. A fiber optic light source sensor wherein said sensor includes:
an optical fiber including a first tapered terminal end and a tip as defined by the end face of the tapered optical fiber, said tip having a diameter less than 10 micrometers;
an optically active material photopolymerized for a duration with light having an intensity onto the tip of said tapered end forming an inward taper and having a size and shape controlled by said photopolymerization process, said optically active material including a dye whose optical response varies in accordance with the particular condition to be sensed:
a light source coupled to a second non-tapered end of said optical fiber where said light source generates light of predetermined intensity and wavelength;
a means for substantially continuously disposing said optically active material of said optical fiber in close proximity to a sample to effectuate a light emission varying in intensity and wavelength in accordance with said chemical interaction between said sample and said optically active material;
an objective lens disposed in proximity to the optically active material of said optic fiber so that light emitted from said material is collected by said objective lens after interaction with the sample; and
a means for analyzing said light emissions absorbed by said objective lens.

* * * * *

UNITED STATES PATENT AND TRADEMARK OFFICE
CERTIFICATE OF CORRECTION

PATENT NO. : 5,361,314

DATED : November 1, 1994

INVENTOR(S) : Raul Kopelman; Weihong Tan; Zhong-You Shi

It is certified that error appears in the above-identified patent and that said Letters Patent is hereby corrected as shown below:

Column 8, Line 65, Claim 1, after "tip" delete "aid" and insert therefor --said--.

Column 10, Line 41, Claim 12, after "by" delete "the" and insert therefor --an--.

Signed and Sealed this

Seventeenth Day of January, 1995

Attest:

BRUCE LEHMAN

Attesting Officer

Commissioner of Patents and Trademarks